(12) United States Patent
Guo et al.

(10) Patent No.: US 10,869,228 B2
(45) Date of Patent: Dec. 15, 2020

(54) RESOURCE ALLOCATION

(71) Applicant: NOKIA SOLUTIONS AND NETWORKS OY, Espoo (FI)

(72) Inventors: Guanhua Guo, Shandong (CN); Yigang Cai, Naperville, IL (US); Zhi Wang, Qingdao (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/735,952

(22) Filed: Jan. 7, 2020

(65) Prior Publication Data
US 2020/0260331 A1 Aug. 13, 2020

(30) Foreign Application Priority Data

Feb. 13, 2019 (FI) ...................................... 20195110

(51) Int. Cl.
*H04W 28/00* (2009.01)
*H04W 28/26* (2009.01)
*H04W 80/10* (2009.01)
*H04W 88/16* (2009.01)
*H04W 28/20* (2009.01)
*H04M 15/00* (2006.01)

(52) U.S. Cl.
CPC ........... *H04W 28/20* (2013.01); *H04M 15/66* (2013.01); *H04W 28/26* (2013.01); *H04W 80/10* (2013.01); *H04W 88/16* (2013.01)

(58) Field of Classification Search
CPC .............. H04L 65/1016; H04L 65/1069; H04L 65/1006; H04L 65/4007; H04L 43/0817; H04L 41/0893; H04L 43/0876; H04L 65/80; H04L 29/06326; H04L 29/06197; H04W 88/16; H04W 24/08; H04W 76/10; H04W 92/02; H04W 28/0268

See application file for complete search history.

(56) References Cited

U.S. PATENT DOCUMENTS

2003/0186651 A1* 10/2003 Weston ................. H04L 47/805
455/39
2007/0189274 A1 8/2007 Liu
2013/0223437 A1* 8/2013 Lanzinger ........... H04L 65/1069
370/352

(Continued)

FOREIGN PATENT DOCUMENTS

WO WO 2018/112657 A1 6/2018

OTHER PUBLICATIONS

Extended European Search Report dated May 27, 2020 corresponding to European Patent Application No. 20154217.2.

(Continued)

*Primary Examiner* — Awet Haile
(74) *Attorney, Agent, or Firm* — Squire Patton Boggs (US) LLP

(57) ABSTRACT

Apparatuses and methods for resource allocation. A method includes: obtaining a future traffic estimate in a data network of a cellular radio network based on past traffic in the data network; requesting a pool of session resources from a border gateway of the data network based on the future traffic estimate; and allocating repeatedly dedicated resources including an IP address and a port of the border gateway for each session from the pool of session resources.

17 Claims, 13 Drawing Sheets

(56) References Cited

U.S. PATENT DOCUMENTS

| | | | |
|---|---|---|---|
| 2014/0204172 A1 | 7/2014 | Rodde et al. | |
| 2015/0063346 A1* | 3/2015 | Eswara | H04L 65/103 370/352 |
| 2016/0057788 A1 | 2/2016 | Sharma et al. | |
| 2017/0104688 A1 | 4/2017 | Mirahsan et al. | |
| 2018/0097939 A1 | 4/2018 | McGraw et al. | |
| 2018/0276538 A1 | 9/2018 | Gopalan | |
| 2019/0319990 A1* | 10/2019 | Dong | H04L 65/1069 |

OTHER PUBLICATIONS

Communication of Acceptance dated Nov. 12, 2019 corresponding to Finnish Patent Application No. 20195110.

Finnish Search Report dated Apr. 24, 2019 corresponding to Finnish Patent Application No. 20195110.

Office Action dated Apr. 24, 2019 corresponding to Finnish Patent Application No. 20195110.

Office Action dated Jul. 8, 2019 corresponding to Finnish Patent Application No. 20195110.

Ioannis M. Stephanakis et al., "Multimedia Content Distribution over Next-Generation Heterogeneous Networks Featuring a Service Architecture of Sliced Resources," IFIP International Conference on Artificial Intelligence Applications and Innovations (AIAI 2012), Springer, pp. 300-310, 2012.

3GPP TS 23.503 V15.4.0 (Dec. 2018), Technical Specification, 3rd Generation Partnership Project; Technical Specification Group Services and System Aspects; Policy and Charging Control Framework for the 5G System; Stage 2 (Release 15), Dec. 18, 2018.

3GPP TS 29.211 V6.4.0 (Jun. 2007), Technical Specification, 3rd Generation Partnership Project; Technical Specification Group Core Network and Terminals; Rx Interface and Rx/Gx signalling flows (Release 6), Jun. 22, 2007.

* cited by examiner

```
400
v=0
o=mhandley 2890844526 2890842807 IN IP4 126.16.64.4
s=SDP Seminar
i=A Seminar on the session description protocol
u=http://www.cs.ucl.ac.uk/staff/M.Handley/sdp.03.ps
e=mjh@isi.edu (Mark Handley)
c=IN IP4 224.2.17.12/127
t=2873397496 2873404696
a=recvonly
m=audio 49170 RTP/AVP 0
m=video 51372 RTP/AVP 31
m=application 32416 udp wb
a=orient:portrait
```

```
800
timestamp, session count, audio count, video count
1485773733123,1139, 614, 692
1485773734123,1760, 903, 1045
1485773735123,1888, 988, 993
1485773736123,1880, 1056, 894
1485773737123,1601, 923, 956
1485773762123,1254, 687, 702,
......
```

```
900
<PA-Request> ::= < Diameter Header: 276, REQ, PXY >
                 < Pair-Id >
                 { Origin-Host }
                 { Origin-Realm }
                 { Destination-Realm }
                 { Destination-Host }
                *[ RequestedData ]
                *[ RealData ]
```

FIG. 9

```
1000
<PA-Answer> ::= < Diameter Header: 276, PXY >
                < Pair-Id >
                { Origin-Host }
                { Origin-Realm }
                [ Result-Code ]
                [ Experimental-Result ]
               *[ PredictionData ]
```

FIG. 10

```
                    1200
                     |
    ┌─────────────────────────────────────────────┐
    │ BGW allocated IP and port binding list:     │
    │                                             │
    │ Binding1:  (IP X, Port X1) (IP Z, Port Z1)  │
    │ Binding2:  IP X, Port X2) (IP Z, Port Z2)   │
    │ Binding3:  (IP X, Port X3) (IP Z, Port Z3)  │
    │ Binding4:  (IP X, Port X4) (IP Z, Port Z4)  │
    │ Binding5:  (IP X, Port X5) (IP Z, Port Z5)  │
    │ Binding6:  (IP X, Port X6) (IP Z, Port Z6)  │
    │ Binding7:  (IP X, Port X7) (IP Z, Port Z7)  │
    │ Binding8:  (IP X, Port X8) (IP Z, Port Z8)  │
    │ Binding9:  (IP X, Port X9) (IP Z, Port Z9)  │
    │ Binding10: (IP X, Port X10) (IP Z, Port Z10)│
    │ ......                                      │
    │                                             │
    │ IPX: total bandwidth: 300                   │
    └─────────────────────────────────────────────┘
```

```
Command AA_GQPRequest:

AVP SessionId 1/1(mSeqNum = -1) = pcsf-aut1.imsgroup0-000.ci34b.imsate.lucentlab.com;1;1;5.810516480.1

AVP MediaComponentDescription 1/8(mSeqNum = -1)
    AVP MediaComponentNumber 1/1(mSeqNum = -1) = 0x00000001 - 1
    AVP MediaSubComponent 1/6(mSeqNum = -1)
        AVP FlowNumber 1/1(mSeqNum = -1) = 0x00000001 - 1
        AVP FlowDescription 1/2(mSeqNum = -1) = permit out 17 from any 0 to 173.16.0.254 0
    AVP MediaSubComponent 2/6(mSeqNum = -1)
        AVP FlowNumber 1/1(mSeqNum = -1) = 0x00000002 - 2
        AVP FlowDescription 1/2(mSeqNum = -1) = permit out 17 from any 0 to 173.16.0.254 0
        AVP FlowDescription 2/2(mSeqNum = -1) = permit in 17 from 173.16.0.254 0 to any 0
        AVP FlowUsage 1/1(mSeqNum = -1) = 0x00000001 - 1 - Rtcp
    AVP CodecData 1/2(mSeqNum = -1) = uplink_offer_m=audio 10 RTP/AVP 96_a=rtpmap:96 AMR/8000_a=fmtp:96 mode-set=0,1,2,3,4., 0x75......
    AVP CodecData 2/2(mSeqNum = -1) = uplink_offer_m=audio 10 RTP/AVP 96 97_a=rtpmap:96 AMR/8000_a=fmtp:96 mode-set=0,1,2,3,4_a=rtpmap:97 AMR/8000_,
0x7570........
    AVP MediaType 1/1(mSeqNum = -1) = 0x00000000 - 0 - Audio
    AVP MaxRequestedBandwidthUl 1/1(mSeqNum = -1) = 0x0001f400 - 128000
    AVP MaxRequestedBandwidthDl 1/1(mSeqNum = -1) = 0x0001f400 - 128000
    AVP FlowStatus 1/1(mSeqNum = -1) = 0x00000003 - 3 - Disabled
AVP MediaComponentDescription 2/8(mSeqNum = -1)
    AVP MediaComponentNumber 1/1(mSeqNum = -1) = 0x00000002 - 2
    AVP MediaSubComponent 1/6(mSeqNum = -1)
        AVP FlowNumber 1/1(mSeqNum = -1) = 0x00000001 - 1
    AVP MediaSubComponent 2/6(mSeqNum = -1)
        AVP FlowNumber 1/1(mSeqNum = -1) = 0x00000002 - 2
        AVP FlowDescription 1/2(mSeqNum = -1) = permit out 17 from any 0 to 173.16.0.254 0
        AVP FlowDescription 2/2(mSeqNum = -1) = permit in 17 from 173.16.0.254 0 to any 0
        AVP FlowUsage 1/1(mSeqNum = -1) = 0x00000001 - 1 - Rtcp
    AVP CodecData 1/2(mSeqNum = -1) = uplink_offer_m=audio 10 RTP/AVP 96_a=rtpmap:96 AMR-WB/16000_a=fmtp:96 mode-set=0,1,3,5,7,8., 0x757......
    AVP CodecData 2/2(mSeqNum = -1) = uplink_offer_m=audio 10 RTP/AVP 96 97_a=rtpmap:96 AMR-WB/16000_a=fmtp:96 mode-set=0,1,3,5,7,8_a=rtpmap:97 AMR-
WB/16000_, 0x75......
    AVP MediaType 1/1(mSeqNum = -1) = 0x00000000 - 0 - Audio
    AVP MaxRequestedBandwidthUl 1/1(mSeqNum = -1) = 0x0001f400 - 128000
    AVP MaxRequestedBandwidthDl 1/1(mSeqNum = -1) = 0x0001f400 - 128000
    AVP FlowStatus 1/1(mSeqNum = -1) = 0x00000003 - 3 - Disabled
AVP BindingInformation 1/1(mSeqNum = -1)
    AVP BindingInputList 1/1(mSeqNum = -1)
        AVP V4TransportAddress 1/32(mSeqNum = -1)
            AVP FramedIpAddress 1/1(mSeqNum = -1) = ..., 0x01010101
            AVP PortNumber 1/1(mSeqNum = -1) = 0x0000000a - 10
        AVP V4TransportAddress 2/32(mSeqNum = -1)
            AVP FramedIpAddress 1/1(mSeqNum = -1) = ..., 0x00000000
            AVP PortNumber 1/1(mSeqNum = -1) = 0x00000000 - 0
        AVP V4TransportAddress 3/32(mSeqNum = -1)
            AVP FramedIpAddress 1/1(mSeqNum = -1) = ..., 0x01010101
            AVP PortNumber 1/1(mSeqNum = -1) = 0x0000000b - 11
        AVP V4TransportAddress 4/32(mSeqNum = -1)
            AVP FramedIpAddress 1/1(mSeqNum = -1) = ..., 0x00000000
            AVP PortNumber 1/1(mSeqNum = -1) = 0x00000000 - 0
        AVP V4TransportAddress 5/32(mSeqNum = -1)
            AVP FramedIpAddress 1/1(mSeqNum = -1) = ..., 0x01010101
            AVP PortNumber 1/1(mSeqNum = -1) = 0x0000000a - 10
        AVP V4TransportAddress 6/32(mSeqNum = -1)
            AVP FramedIpAddress 1/1(mSeqNum = -1) = ..., 0x00000000
            AVP PortNumber 1/1(mSeqNum = -1) = 0x00000000 - 0
        AVP V4TransportAddress 7/32(mSeqNum = -1)
            AVP FramedIpAddress 1/1(mSeqNum = -1) = ..., 0x01010101
            AVP PortNumber 1/1(mSeqNum = -1) = 0x0000000b - 11
        AVP V4TransportAddress 8/32(mSeqNum = -1)
            AVP FramedIpAddress 1/1(mSeqNum = -1) = ..., 0x00000000
            AVP PortNumber 1/1(mSeqNum = -1) = 0x00000000 - 0
```

```
Command AA_GQPAnswer:

AVP SessionId 1/1 = pcsf-aut1.imsgroup6-009.ci34b.imsate.lucentlab.com;1;1;5.810516480.1
....
AVP BindingInformation 1/1
    AVP BindingInputList 1/1
        AVP V4TransportAddress 1/32
            AVP FramedIpAddress 1/1 = ...., 0x01010101
            AVP PortNumber 1/1 = 0x0000000a - 10
        AVP V4TransportAddress 2/32
            AVP FramedIpAddress 1/1 = ...., 0x00000000
            AVP PortNumber 1/1 = 0x00000000 - 0
        AVP V4TransportAddress 3/32
            AVP FramedIpAddress 1/1 = ...., 0x01010101
            AVP PortNumber 1/1 = 0x0000000b - 11
        AVP V4TransportAddress 4/32
            AVP FramedIpAddress 1/1 = ...., 0x00000000
            AVP PortNumber 1/1 = 0x00000000 - 0
        AVP V4TransportAddress 5/32
            AVP FramedIpAddress 1/1 = ...., 0x01010101
            AVP PortNumber 1/1 = 0x0000000a - 10
        AVP V4TransportAddress 6/32
            AVP FramedIpAddress 1/1 = ...., 0x00000000
            AVP PortNumber 1/1 = 0x00000000 - 0
        AVP V4TransportAddress 7/32
            AVP FramedIpAddress 1/1 = ...., 0x01010101
            AVP PortNumber 1/1 = 0x0000000b - 11
        AVP V4TransportAddress 8/32
            AVP FramedIpAddress 1/1 = ...., 0x00000000
            AVP PortNumber 1/1 = 0x00000000 - 0
    AVP BindingOutputList 1/1
        AVP V4TransportAddress 1/32
            AVP FramedIpAddress 1/1 = oooo
            AVP PortNumber 1/1 = 0x00002710 - 10000
        AVP V4TransportAddress 2/32
            AVP FramedIpAddress 1/1 = oooo
            AVP PortNumber 1/1 = 0x00002714 - 10004
        AVP V4TransportAddress 3/32
            AVP FramedIpAddress 1/1 = oooo
            AVP PortNumber 1/1 = 0x00002711 - 10001
        AVP V4TransportAddress 4/32
            AVP FramedIpAddress 1/1 = oooo
            AVP PortNumber 1/1 = 0x00002715 - 10005
        AVP V4TransportAddress 5/32
            AVP FramedIpAddress 1/1 = oooo
            AVP PortNumber 1/1 = 0x00002712 - 10002
        AVP V4TransportAddress 6/32
            AVP FramedIpAddress 1/1 = oooo
            AVP PortNumber 1/1 = 0x00002716 - 10006
        AVP V4TransportAddress 7/32
            AVP FramedIpAddress 1/1 = oooo
            AVP PortNumber 1/1 = 0x00002713 - 10003
        AVP V4TransportAddress 8/32
            AVP FramedIpAddress 1/1 = oooo
            AVP PortNumber 1/1 = 0x00002717 - 10007
AVP AuthorizationLifetime 1/1 = 0x00057e40 - 360000
AVP MediaComponentDescription 1/8
    AVP MediaComponentNumber 1/1 = 0x00000001 - 1
    AVP CodecData 1/2 = uplink_offer.m=audio 10000 RTP/AVP 96 a=rtpmap:96 AMR/8000 a=fmtp:96 mode-set=0,1,2,3,4., 0x75......
    AVP CodecData 2/2 = uplink_offer.m=audio 10004 RTP/AVP 96 97 a=rtpmap:96 AMR/8000 a=fmtp:96 mode-set=0,1,2,3,4 a=rtpmap:97 AMR/8000., 0x7570......
AVP MediaComponentDescription 2/8
    AVP MediaComponentNumber 1/1 = 0x00000002 - 2
    AVP CodecData 1/2 = uplink_offer.m=audio 10002 RTP/AVP 96 a=rtpmap:96 AMR-WB/16000 a=fmtp:96 mode-set=0,1,3,5,7,8., 0x7570........
    AVP CodecData 2/2 = uplink_offer.m=audio 10006 RTP/AVP 96 97 a=rtpmap:96 AMR-WB/16000 a=fmtp:96 mode-set=0,1,3,5,7,8 a=rtpmap:97 AMR-WB/16000.,
0x7570......
AVP OriginStateId 1/1 = 0x5b7cbd99 - 1534901657
```

FIG. 16

RESOURCE ALLOCATION

FIELD

Various example embodiments relate to a resource allocation in a data network of a cellular radio network.

BACKGROUND

A cellular radio network uses a data network (DN) such as an IP multimedia subsystem (IMS) to provide multimedia services. The resource allocation in a border gateway enables the use of the data network.

BRIEF DESCRIPTION

According to an aspect, there is provided subject matter of independent claims. Dependent claims define some example embodiments.

One or more examples of implementations are set forth in more detail in the accompanying drawings and the description of embodiments.

LIST OF DRAWINGS

Some example embodiments will now be described with reference to the accompanying drawings, in which FIG. 1 illustrates an example embodiment of a general architecture of a cellular radio system;

FIG. 9 and FIG. 10 illustrate example embodiments of custom messages of an Rx interface;

FIG. 12 illustrates an example embodiment of border gateway allocated resources;

Figure 13A:
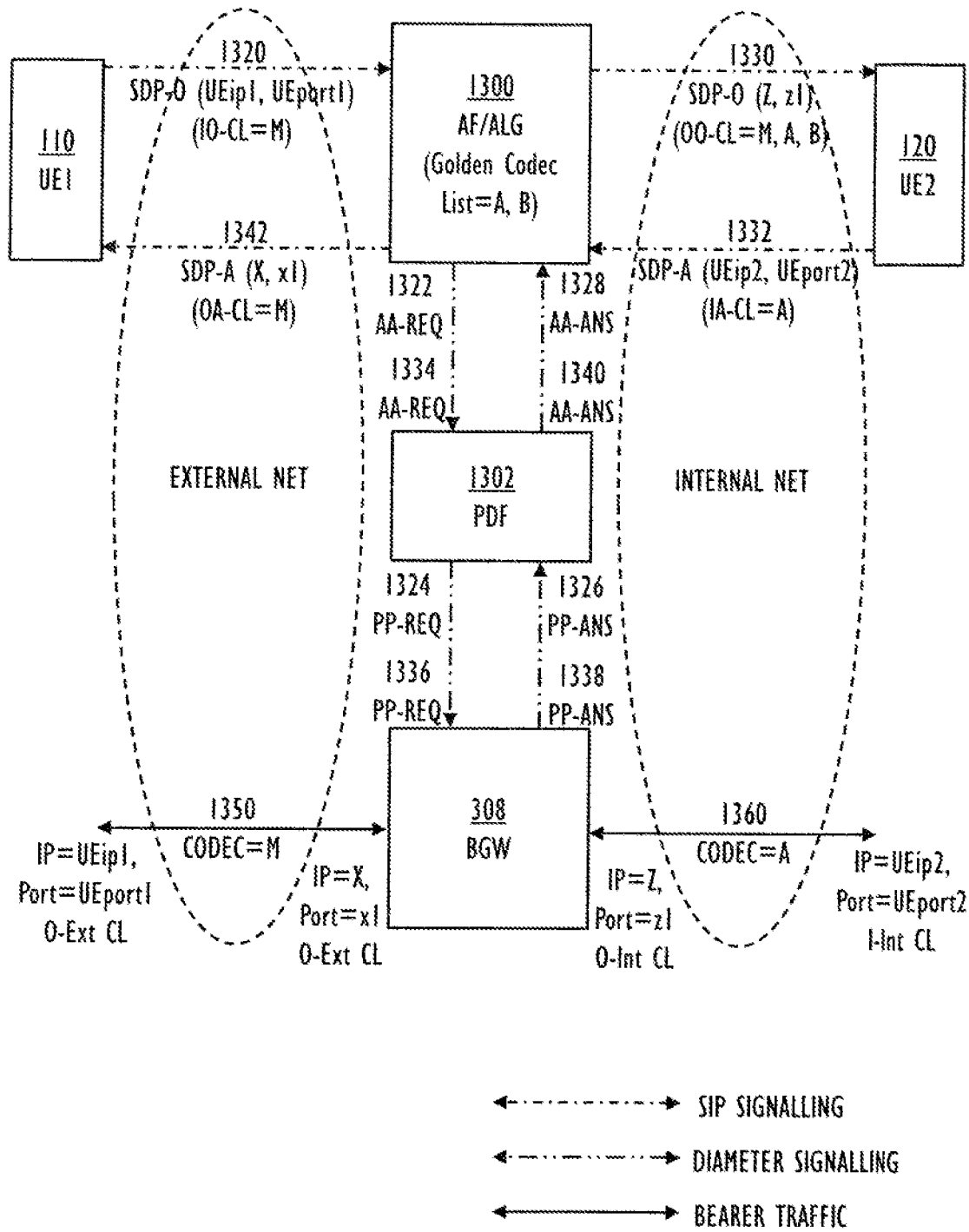
Figure 13B:
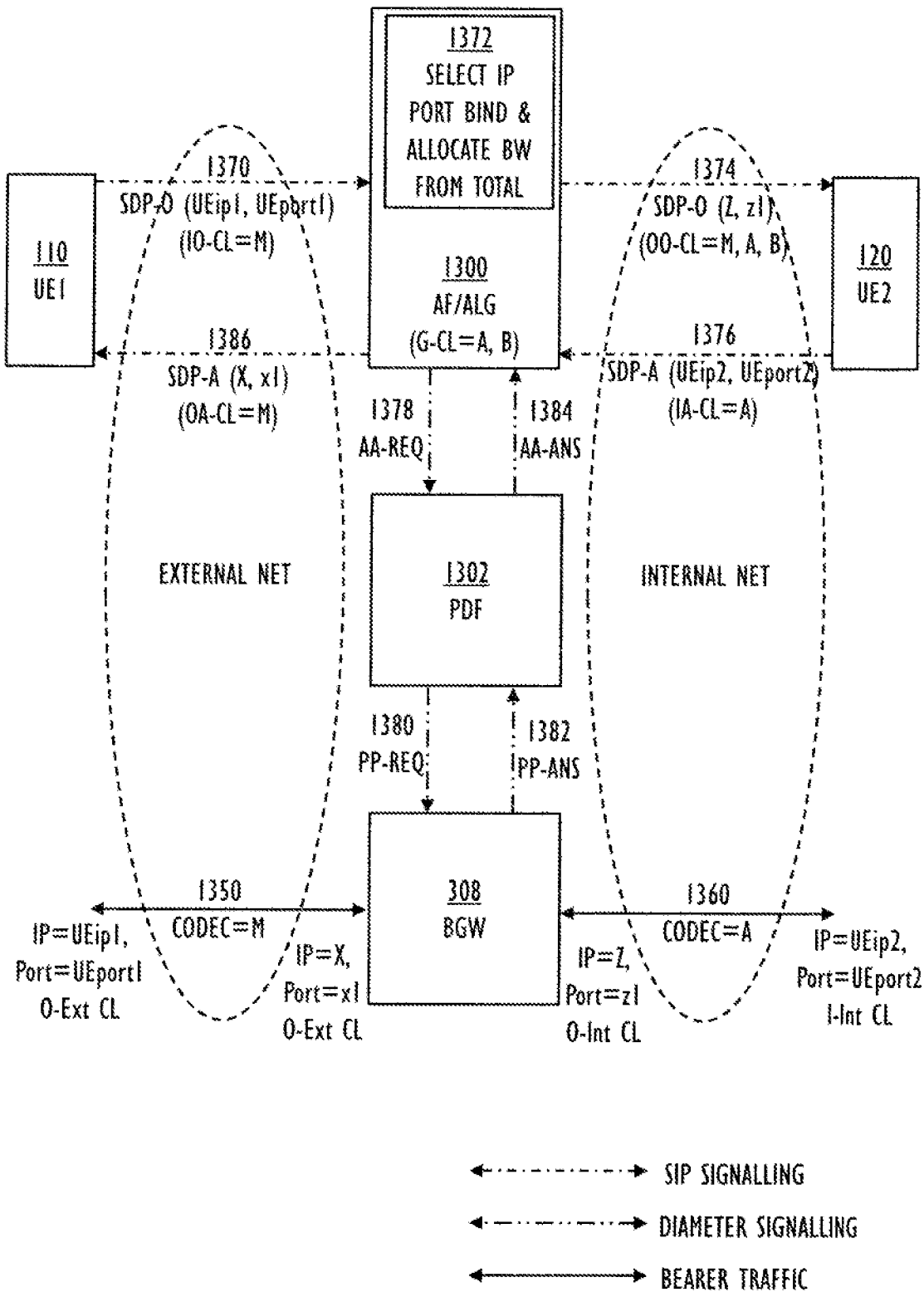
Figure 14:
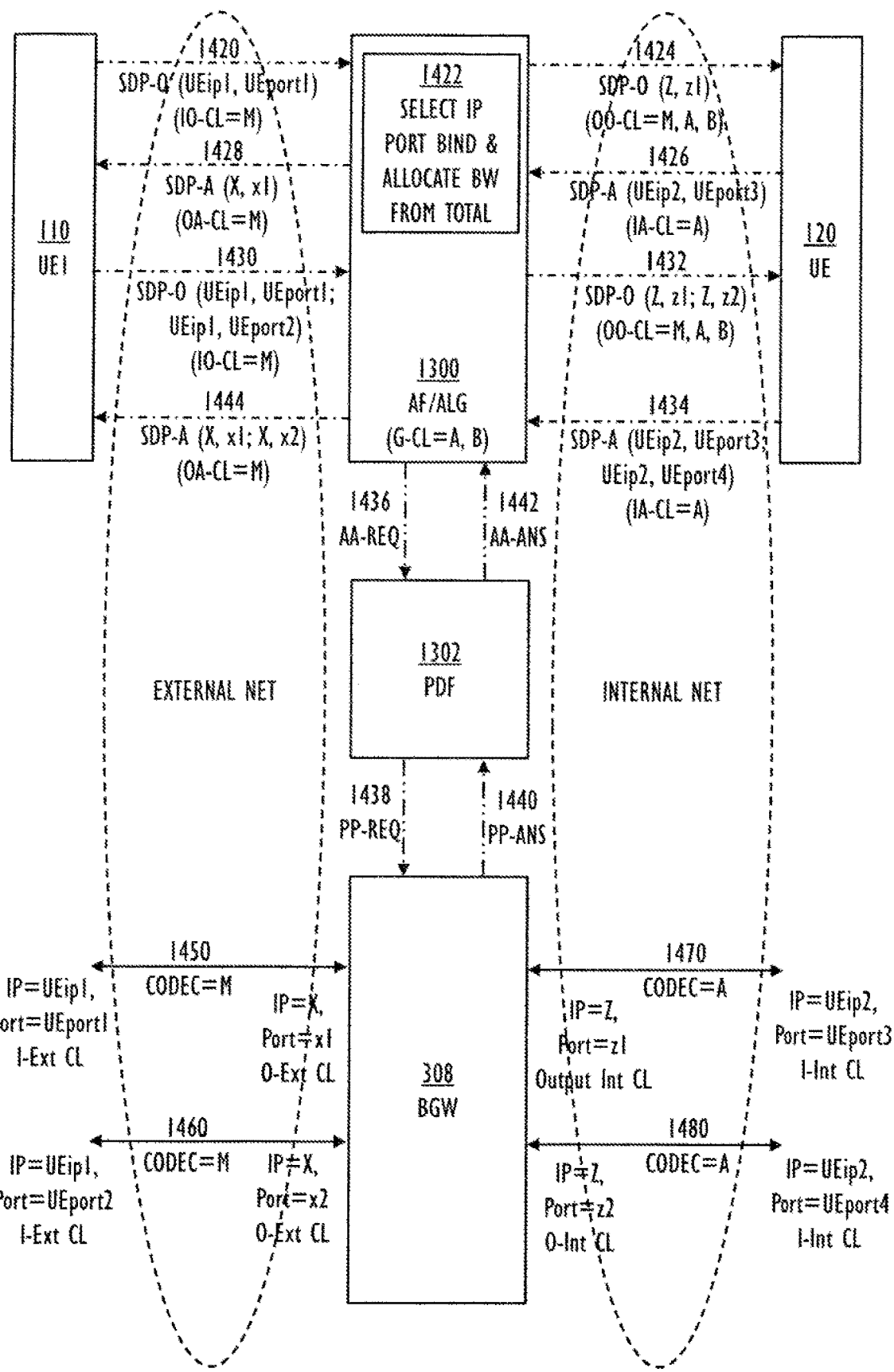

FIG. 13A, FIG. 13B, and FIG. 14 illustrate example embodiments of a resource allocation procedure;

FIG. 15 illustrates an example embodiment of an AA request message;

FIG. 16 illustrates an example embodiment of an AA answer message; and

Figure 17:
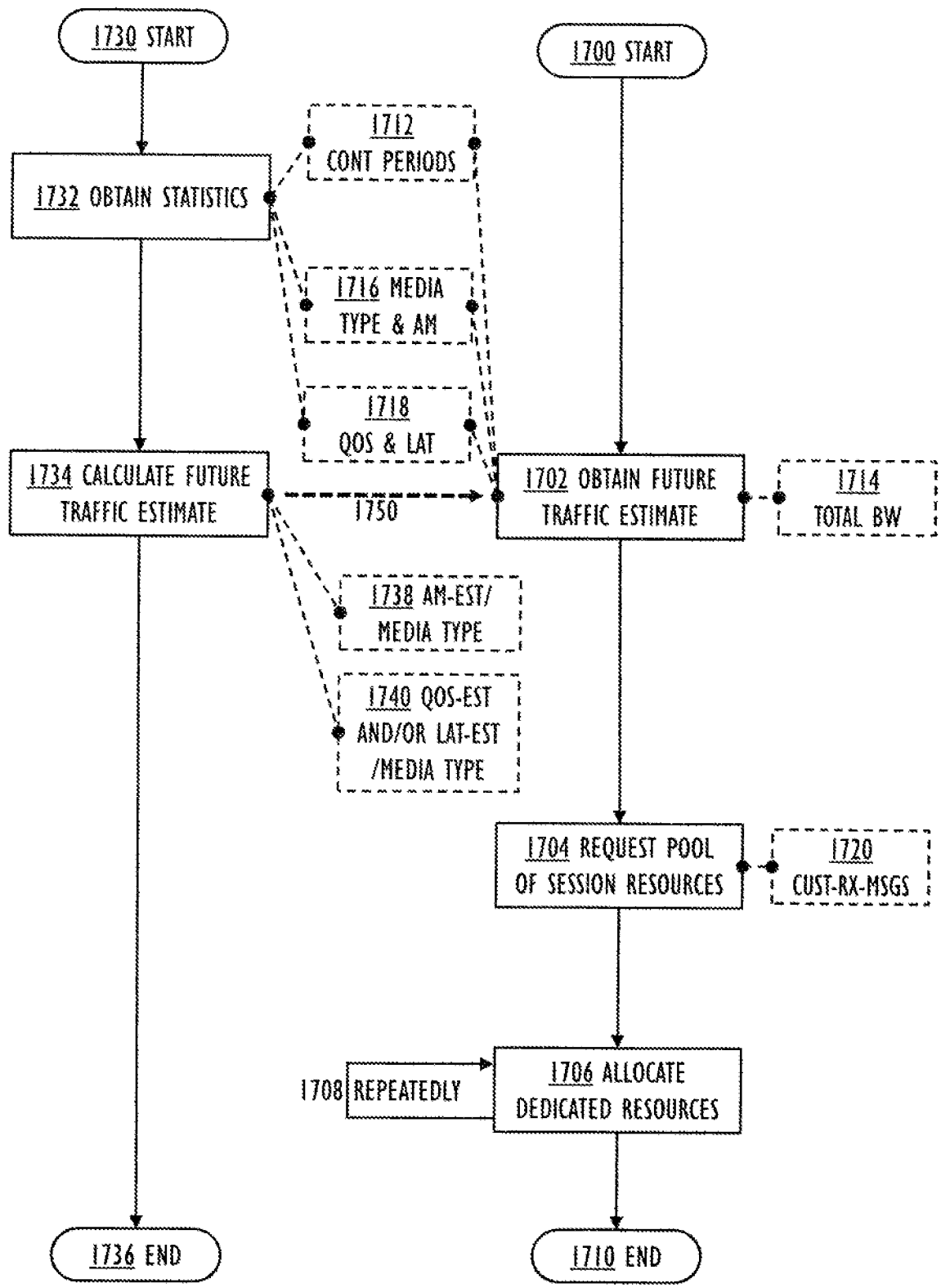

FIG. 17 illustrates example embodiments of two methods.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the example embodiments and in the claims, serve to illustrate the example embodiments with reference to the drawings, without limiting it to these examples only.

In the following, different example embodiments will be described using as an example of a cellular radio system the 5G cellular technology without restricting the embodiments to such an architecture, however.

The skilled person may also apply the example embodiments to other kinds of communications networks including the resource allocation of the border gateway by adjusting parameters and procedures appropriately.

All Figures depict examples of a simplified system architecture and simplified apparatuses only showing some elements and functional entities, all being logical units, whose implementation may differ from what is shown. The connections shown are logical connections; the actual physical connections may be different. It is apparent to a person skilled in the art that the system typically comprises also other functions and structures besides those shown.

Figure 1:
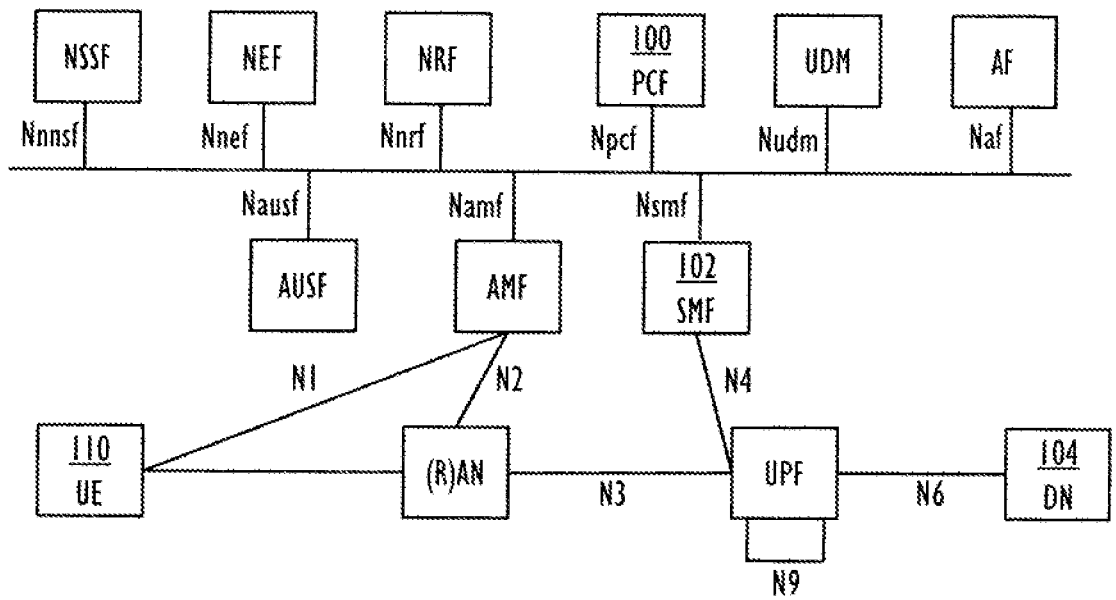

Fifth Generation (5G) network architecture and services develop rapidly (as specified in 3GPP TS 23.501, for example). The 5G has the following characteristics: high speed, low latency, and so on. Different users have different Quality of Service (QoS) requirements. In the 5G architecture, a policy control function (PCF) 100 provides all mobility, access, and session related policies. FIG. 1 depicts the 5G System architecture in the non-roaming case, using the reference point representation showing how various network functions interact with each other.

An IP multimedia subsystem (IMS) domain, as one kind of data network (DN) 104 in 5G, provides many IP multimedia services, such as high-definition (HD) voice (VoIP or VoLTE), Wi-Fi calling, enriched messaging (e.g., instant messaging), enriched calling with pre-call information, video calling, HD video conferencing, video on demand (VoD), web communication, etc. 3GPP TS 23.228 depicts using 5GS to access IMS.

The user apparatus 110, 120 (also called user equipment UE, user terminal, terminal device, subscriber terminal, etc.) illustrates one type of an apparatus to which resources of the air cellular radio network are allocated and assigned.

The user apparatus 110 typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that the user apparatus 110 may also be a nearly exclusive uplink only device, of which an example is a camera or video camera loading images or video clips to a network. The user apparatus 110 may also be a device having capability to operate in Internet of Things (IoT) network which is a scenario in which objects are provided with the ability to transfer data over a network without requiring human-to-human or human-to-computer interaction. One technology in the above network may be denoted as narrowband Internet of Things (NB-Iot). The user apparatus 110 may also be a device having capability to operate utilizing enhanced machine-type communication (eMTC).

The user apparatus 110 may also utilize cloud. In some applications, the user apparatus 110 may comprise a small portable device with radio parts (such as a watch, earphones or eyeglasses) and the computation is carried out in the cloud.

Figure 2:
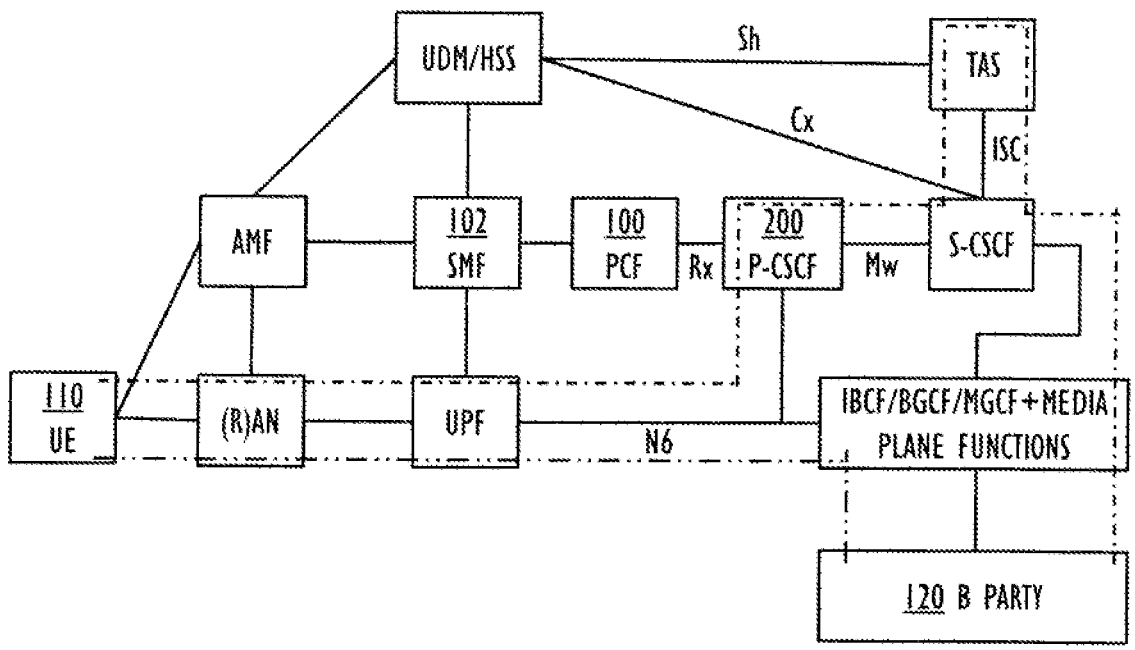
FIG. 2 illustrates an example embodiment of an IP multimedia subsystem in relation to the cellular radio system.

FIG. 2 shows an architecture between 5G and IMS networks.

5G network users need to utilize the services provided by the IMS, and the IMS users also need to utilize the 5G services, such as augmented and virtual reality (AR/VR), automotive signal streaming, Internet of Things, which are considered as the first wave of 5G killer apps. For such service experiences, latency plays a critical role, and long latency is intolerable for users. Therefore, it is important for IMS networks to provide low network latency.

Figures 3, 4:
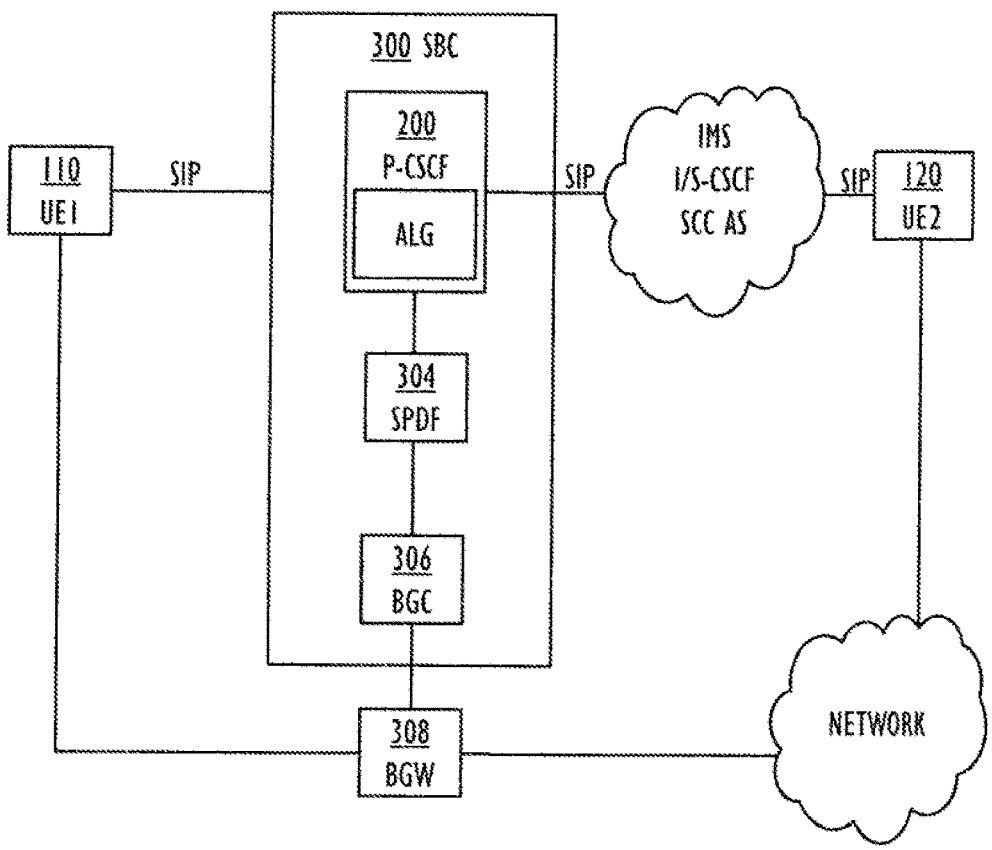
FIG. 3 illustrates an example embodiment of a session border controller and a border gateway.
FIG. 4 illustrates an example embodiment of a session description protocol message.

Session border controller (SBC) 300 shown in FIG. 3 is widely used in the IMS networks, and serves at the edge of the network as showed in FIG. 2: the SBC is in the place of the P-CSCF (Proxy Call Session Control Function) 200, and responsible for resource management, media transfer, security control, etc. Besides, the SBC 300 enables interoperability between different domains. To provide low network latency, the SBC 300 is a critical part.

Let us study FIG. 3. To establish a session in the IMS network, the SBC 300 and a BGW (Border Gateway) 308 cooperate to allocate resources for sessions. The SBC 300 includes P-CSCF 200, SPDF (Session Policy Decision Function) 304 and BGC (Border Gateway Controller) 306. The detailed resource allocation procedures are showed in FIG. 13A (FIG. 13A omits the BGC).

In 1320, an AF/ALG (Application Function/Application Layer Gateway) 1300 receives an SDP (Session Description Protocol) offer (UEip1, UEport1) from the UE1 110, and the SDP includes media numbers and types and codec, etc. An example 400 of the SDP is illustrated in FIG. 4.

In 1322, the AF/ALG 1300 sends an AA-Request to the PDF 1302, and, in 1324, the PDF 1302 sends an PP-Request, which includes the SDP offer and UE1 information (UEip1, UEport1). Upon receiving the related message, the BGW 308 allocates its IP and port and bandwidth for the UEs 110, 120 to transfer media later: IP X, port X1 for UE1 110 to access, and IP Z, port Z1 for the UE2 120 to access. The BGW 308 also binds (UEip1, UEport1) with (IP X, port X1). After this, the BGW 308 responds with an PP-Answer 1326. The AF/ALG 1300 gets the allocation result from an AA-Answer 1328.

In 1330, the AF/ALG 1300 adds the IP Z, port Z1 information to the SDP offer and sends to the UE2 120, and after that the UE2 120 knows to connect to this IP and port to transfer media.

In 1332, the AF/ALG 1300 receives an SDP answer (UEip2, UEport2) from the UE2 120.

In 1334 and 1336, the AF/ALG 1300 sends an AA-Request to the PDF 1302, and the PDF 1302 sends an PP-Request, which includes the SDP answer and UE2 information (UEip2, UEport2). Upon receiving related messages, the BGW 308 checks if there is a need to modify the resources and binds (UEip2, UEport2) with (IP Z, port Z1). After this, the BGW 308 responds with an PP-Answer 1338, and the PDF 1302 sends an AA-Answer 1340.

In 1342, the AF/ALG 1300 adds the IP X, port X1 to an SDP answer and sends to the UE1 110, and after that the UE1 110 knows to connect to this IP and port to transfer media.

After the session is established, the UE1 110 sends media data to IP X, port X1 from UEip1, UEport1, and BGW 308 transfers the data to UEip2, UEport2 from IP Z, port Z1. The codecs 1350, 1360 have also been defined.

The procedure of FIG. 13A includes many message interactions between different modules, for each pair of SDP offer and answer there would be two rounds of AA-Request/Answer and PP-Request/Answer. If there are N pairs of SDP offer and answer, the times of AA-Request/Answer and PP-Request/Answer interaction is 2N. This is time-consuming and cannot meet the low-latency service requirements.

Besides, current IMS network is general and identical for all kinds of services: broadband services, IoT services, low-latency services, and cannot meet the specific QoS requirements of different services.

An example embodiment provides a unique method for reducing latency in the SBC 300 and the IMS network for low-latency services with PCF prediction and SBC resource reservation. This example embodiment includes novelty enhancements in the PCF 100, SBC 300, and an Rx interface between these two elements.

The PCF 100 does statistics about the PDU (Protocol Data Unit) Session policy information, summarizes the amount and media types of low-latency sessions in several continuous predefined periods, then predicts the low-latency session amount in the next period according to an RNN (Recurrent Neural Network) algorithm based on the calculation and statistics. That calculation also counters QoS/QFI influences. After that, the PCF 100 sends the prediction result to SBC 300 that is in IMS edge.

When receiving predication result, the SBC 300 requires the BGW 308 to allocate certain amount of dedicated resources to those sessions with low latency QoS requirements according to the prediction results in advance. The BGW 308 sends all reserved resources to the SBC 300. The PCF 100 adjusts the prediction data dynamically, and the SBC 300 changes the dedicated resource amount accordingly.

In this way, whenever a session establishment invitation message (INVITE) with the SDP offer arrives, the SBC 300 allocates resources from the reservation resources pool on its own without any message interactions with the BGW 308. The SBC 300 notifies the resource allocation to the BGW 308 only after the final SDP answer. Regardless of the number of the SDP offer-answer rounds, there is only one round of message interaction with the BGW 308, which largely reduces the latency.

Basically, there are three novel parts:

1) The PCF 100 does traffic information statistics and predicts traffic modes based on statistics, and these prediction data is used by other network elements to enable a more intelligent network. The example embodiments take low-latency traffic as an example, but this method may be used to predict any traffic mode.

2) New Rx messages to enable the interaction between the SBC 300 and the PCF 100.

3) The SBC 300 invokes the BGW 308 to allocate dedicated resources pool in advance, and after that the SBC 300 allocates resources for each session from this pool, and reduces message interactions with the BGW 308 to reduce latency.

Figure 5:
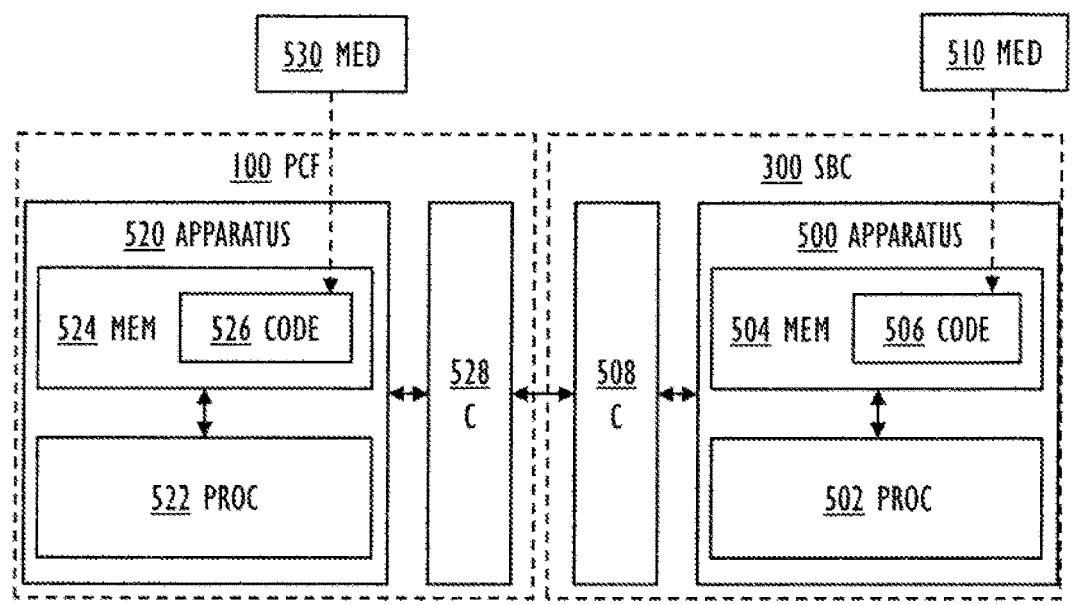
FIG. 5 illustrates example embodiments of apparatuses.

Let us study simultaneously FIG. 5, which illustrate example embodiments of two apparatuses 500, 520 and FIG. 17 which illustrates example embodiments of two methods performed by the apparatuses 500, 520.

In an example embodiment, the apparatus 500 is the session border controller (SBC) 300.

In an example embodiment, the apparatus 520 is the policy control function (PCF) 100.

In an example embodiment, a system comprises the first apparatus 520, and the second apparatus 500.

In an example embodiment, the apparatus 500 is a circuitry.

In an example embodiment, the apparatus 520 is a circuitry.

In an example embodiment, the apparatus 500 is a combination of a processor, memory and software.

In an example embodiment, the apparatus 520 is a combination of a processor, memory and software.

In an example embodiment of FIG. 5, the apparatus 500 comprises one or more processors 502, and one or more memories 504 including computer program code 506. The one or more memories 504 and the computer program code 506 are configured to, with the one or more processors 502, cause the performance of the apparatus 500.

In an example embodiment of FIG. 5, the apparatus 520 comprises one or more processors 522, and one or more memories 524 including computer program code 526. The one or more memories 524 and the computer program code 526 are configured to, with the one or more processors 522, cause the performance of the apparatus 520.

The apparatuses 500, 520 also comprise communication interfaces 508, 528 operating in a wired or wireless fashion and using a standard or proprietary protocol to enable communication between the apparatuses 500, 520.

The term 'processor' 502, 522 refers to a device that is capable of processing data. Depending on the processing power needed, the apparatus 500, 520 may comprise several processors 502, 522 such as parallel processors or a multi-core processor. When designing the implementation of the processor 502, 522 a person skilled in the art will consider the requirements set for the size and power consumption of the apparatus 500, 520, the necessary processing capacity, production costs, and production volumes, for example. The processor 502, 522 and the memory 504, 524 may be implemented by an electronic circuitry.

A non-exhaustive list of implementation techniques for the processor 502, 522 and the memory 504, 524 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The term 'memory' 504, 524 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

The computer program code 506, 526 may be implemented by software. In an example embodiment, the software may be written by a suitable programming language, and the resulting executable code may be stored in the memory and run by the processor.

The one or more memories 502 and the computer program code 506 are configured to, with the one or more processors 502, cause the apparatus 500 at least to perform the algorithm illustrated in FIG. 17 as the method on the right-hand side and starting from 1700.

The one or more memories 522 and the computer program code 526 are configured to, with the one or more processors 522, cause the apparatus 520 at least to perform the algorithm illustrated in FIG. 17 as the method on the left-hand side and starting from 1730.

As explained above, the functionality of the algorithm may be realized by suitably programmed and executed software or by appropriately designed hardware.

In an example embodiment, each apparatus 500, 520 comprises means for causing the apparatus 500, 520 to perform the method.

The operations are not strictly in chronological order in FIG. 17, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

The method including operations 1702-1704-1706-1708 is performed by the apparatus 500 such as the session border controller (SBC) 300.

The method including operations 1732-1734 is performed by the apparatus 520 such as the policy control function (PCF) 100.

Note an arrow 1750 indicating a synchronization point between the two methods: a traffic estimate calculated by an operation 1734 is obtained by an operation 1702.

In 1702, a future traffic estimate in a data network of a cellular radio network is obtained based on past traffic in the data network 104.

In 1704, a pool of session resources is requested from the border gateway 308 of the data network 104 based on the future traffic estimate.

In 1706, dedicated resources including an IP address and a port of the border gateway 308 are allocated repeatedly 1708 for each session from the pool of session resources.

The method performed by the apparatus 500 starts in 1700 and ends in 1710, whereas the method performed by the apparatus 520 starts in 1730 and ends in 1736.

In 1732, statistics of past traffic in a data network of a cellular radio network are obtained based on protocol data unit session policy information.

In 1734, a future traffic estimate in a data network of a cellular radio network is calculated based on the past traffic in the data network, wherein the past traffic comprises the statistics.

In an example embodiment of the apparatus 520, the means are configured to cause the apparatus 520 to perform: obtaining 1732 the statistics regarding a plurality of continuous predefined periods 1712 of the past traffic. And, in a corresponding example embodiment of the apparatus 500, the means are configured to cause the apparatus 500 to perform: obtaining 1702 the future traffic estimate based on a plurality of continuous predefined periods 1712 of the past traffic.

In an example embodiment of the apparatus 520, the means are configured to cause the apparatus 520 to perform: obtaining 1732, 1716 media types and an amount of each media type in the past traffic; and calculating 1734, 1738 an amount estimate of each media type in the future traffic estimate based on the media types and the amount of each media type in the past traffic. And, in a corresponding example embodiment of the apparatus 500, the means are configured to cause the apparatus 500 to perform: obtaining 1702, 1716 media types and an amount estimate of each media type in the future traffic estimate based on media types and an amount of each media type in the past traffic.

In an example embodiment of the apparatus 500, the means are configured to cause the apparatus 500 to perform: calculating 1714 a total bandwidth amount estimate based on the future traffic estimate; and requesting 1704 the pool of session resources also based on the total bandwidth amount estimate.

In an example embodiment of the apparatus 520, the means are configured to cause the apparatus 520 to perform: obtaining 1732, 1718 a quality service and/or a latency in each media type of the past traffic; and calculating 1734, 1740 a required quality of service estimate and/or a required latency estimate of each media type in the future traffic estimate based on the quality service and/or the latency in each media type of the past traffic. And, in a corresponding example embodiment of the apparatus 500, the means are configured to cause the apparatus 500 to perform: obtaining 1702, 1718 a required quality of service estimate and/or a required latency estimate of each media type in the future traffic estimate based on a quality service and/or a latency in each media type of the past traffic.

In an example embodiment of the apparatus 500, the means are configured to cause the apparatus 500 to perform: requesting 1706 the pool of session resources from the border gateway using one or more custom messages 1720 of an Rx interface.

In an example embodiment illustrated in FIG. 5, a computer-readable medium 510 comprises the computer program code 506, which, when loaded into the one or more processors 502 and executed by the one or more processors 502 causes the apparatus 500 to perform the method comprising: obtaining 1720 a future traffic estimate in a data network of a cellular radio network based on past traffic in the data network; requesting 1704 a pool of session resources from a border gateway of the data network based on the future traffic estimate; and allocating 1706 repeatedly 1708 dedicated resources including an IP address and a port of the border gateway for each session from the pool of session resources.

In an example embodiment illustrated also in FIG. 5, a computer-readable medium 530 comprises the computer program code 526, which, when loaded into the one or more processors 522 and executed by the one or more processors 522 causes the apparatus 520 to perform the method comprising: obtaining 1732 statistics of past traffic in a data network of a cellular radio network based on protocol data unit session policy information; calculating 1734 a future traffic estimate in a data network of a cellular radio network based on the past traffic in the data network, wherein the past traffic comprises the statistics.

The example embodiments of the apparatus 500, 530 and the method of FIG. 17 may be used to enhance the operation of the computer program code 506, 526. In an example embodiment, the computer program code 506, 526 may be in source code form, object code form, executable file, or in some intermediate form, for example. The computer-readable medium 510, 530 may comprise at least the following: any entity or device capable of carrying computer program code 506, 526 to the apparatus 500, 520, a record medium, a computer memory, a read-only memory, an electrical carrier signal, a telecommunications signal, and a software distribution medium. In some jurisdictions, depending on the legislation and the patent practice, the computer-readable medium 510, 530 may not be the telecommunications signal. In an example embodiment, the computer-readable medium 510, 530 may be a non-transitory computer-readable storage medium.

Figure 6:
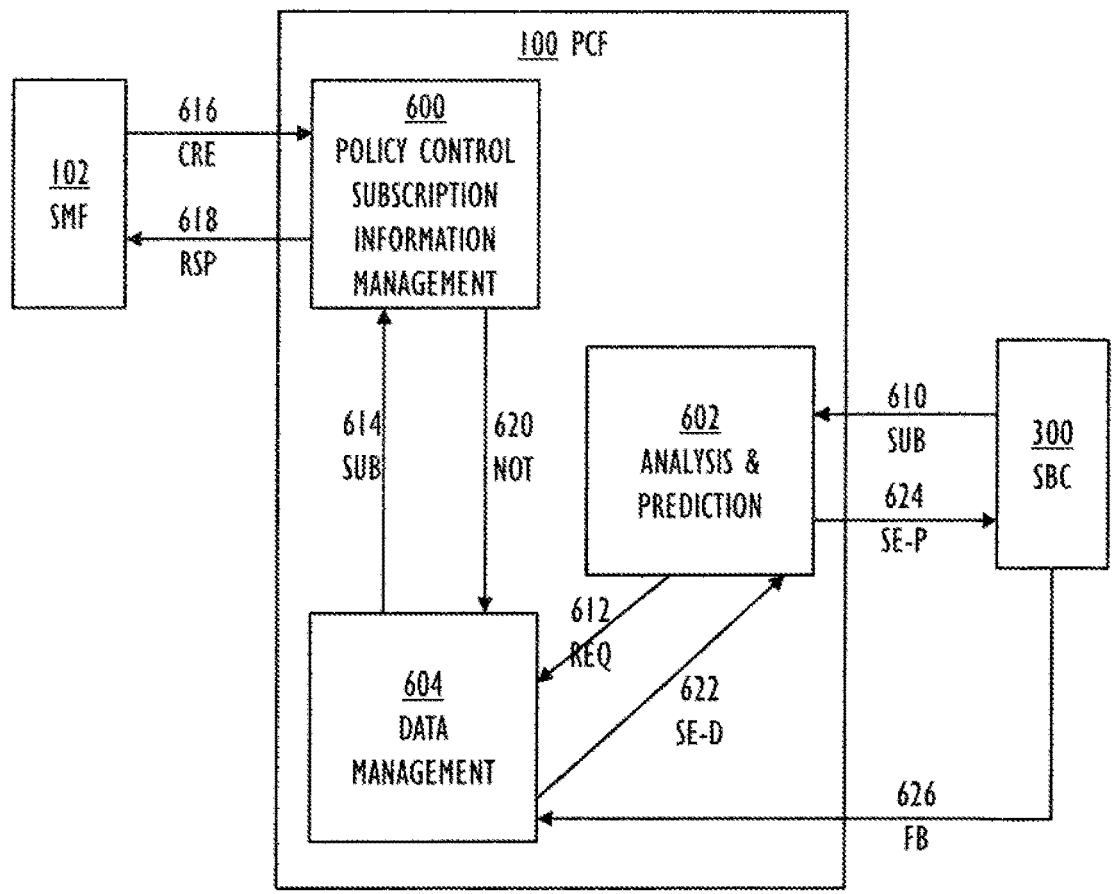
FIG. 6 illustrates an example embodiment of a policy control function.

FIG. 6 illustrates an example embodiment of the PCF 100 prediction solution architecture. The solution adds two new modules in the PCF 100: a data management module 604 and an analysis & prediction module 602 to realize the prediction mechanism. A policy control subscription information management module 600 is an existing module. The solution includes four main procedures: 610-612-614, 616-618-620, 622-624, and 626. In the following, the four procedures and functions of the two new modules will be explained in detail.

The first procedure 610-612-614 is mainly for defining what traffic data should be predicted, that is, what data prediction solution users want to get. For example, low-latency traffic numbers, high-bandwidth traffic numbers.

610) The SBC 300 as one prediction solution user subscribes to the analysis & prediction module 602 in the PCF 100 to let the analysis & prediction module 602 to know it needs a defined kind of prediction data. For example, the SBC 300 wants to know the counts of low-latency required sessions that will traverse the SBC 300 and the specific media types of these sessions. This will be discussed as an example embodiment in the following.

612) After receiving the SBC subscribe, the analysis & prediction module 602 analyzes what kind of original data it needs to do the prediction. The analysis & prediction module 602 determines that latency requirement and media types of sessions are its needed original data. Then the analysis & prediction module 602 sends a request to the data management module 604 to collect related data.

614) Upon request, the data management module 604 subscribes to the policy control subscription information management module 600, which manages all the policy control information in the PCF 100. After subscription, the policy control subscription information management module 600 sends related data of each session to the data management module 604.

The second procedure 616-618-620 is responsible for collecting related session data.

616) For each session, a SMF (Session Management Function) 102 sends an Npcf_SMPolicyControl_Create to the PCF 100 to do policy decision.

618) The PCF 100 replies with an Npcf_SMPolicyControl_Response to the SMF 102 with policy information defined in 3GPP TS 23.503, the policy information including: media types, latency requirements, etc.

620) The policy control subscription information management module 600 sends the related data of this session to the data management module 604 according to the registration information of the data management module 604.

The third procedure 622-624 is responsible for data analysis and prediction.

622) The data management module 604 first does data pre-processing, then sends pre-processed data to the analysis & prediction module 602.

624) The analysis & prediction module 602 applies a prediction algorithm to predict the session counts in the incoming period. The details of data pre-processing and prediction mechanism is showed in FIG. 7. In an example embodiment, a machine learning model named RNN (Recurrent Neural Network) may be used as the foundation. Furthermore, LSTM (Long Short Term Memory) is a variation of RNN that may be used as well.

Figures 7, 8:
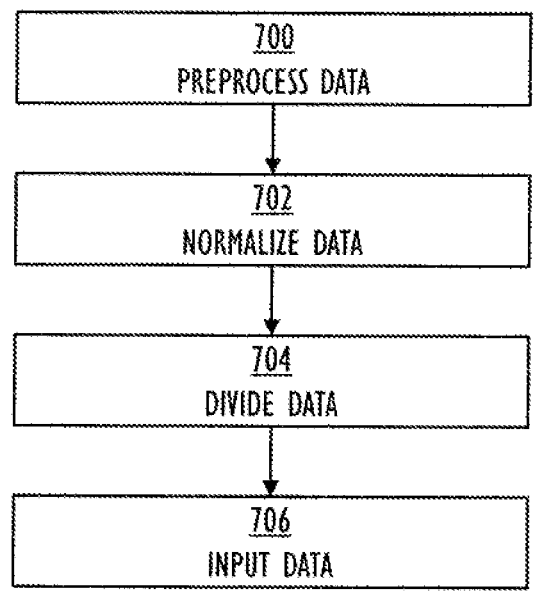
FIG. 7 illustrates an example embodiment of a neural network training.
FIG. 8 illustrates an example embodiment of a sample data set used in the neural network training.

The procedures of data pre-processing and prediction mechanism are illustrated in FIG. 7.

700) The data management module 604 does data processing: organize all collected data into the format of the sample data set 800 illustrated in FIG. 8. The sample data set 800 comprises the session count, audio count, media count in every 100 seconds.

702) The data management module 604 does data normalization, and changes data into the scope between 0 and 1.

704) The data management module 604 divides 80% of sample data set into a training data set, and 20% of sample data set into a testing data set.

706) The training and testing data set is input to an LSTM instance, and the LSTM instance begins to train itself based on the input data set.

After the LSTM instance is trained, the data management module 604 sends organized data to the trained LSTM instance every 100 seconds, and the trained LSTM instance predicts the future traffic estimate based on the data. The analysis & prediction module 602 changes the data format from the normalization to the regular format and sends the prediction results to the SBC 300 in 624.

The fourth procedure 626 is for the SBC 300 to send real data to the PCF 100 to train the LSTM instance to predict more precisely. After the data management module 604 has received such data, it sends the data to analysis & prediction module to train the LSTM instance. The SBC 300 may record the actual session count and media types and count sessions traversing the SBC 300.

Operations 610 and 624 need to use newly created Rx messages. As 3GPP defined Rx reference point (3GPP TS 29.211) does not meet the newly defined functions described above between the PCF 100 and the SBC 300, new Rx messages (PAR and PAA) are created to meet the need.

For the 300 SBC and the PCF 100 to exchange a prediction request and results, two new Rx messages are proposed: a Prediction-Auth-Request (PAR) command 900 illustrated in FIG. 9 and a Prediction-Auth-Answer (PAA) command 1000 illustrated in FIG. 10.

The PAR command 900, indicated by the Command-Code field set to '276' and the 'R' bit set in the Command Flags field, is sent by the SBC 300 to the PCF 100 in 610 to inform of what kind of prediction data is requested.

The PAA command 1000, indicated by the Command-Code field set to '276' and the 'R' bit cleared in the Command Flags field, is sent by the PCF 100 to the SBC 300 in 624 in response to the PAR command 900 with the prediction data.

The meanings of AVPs (Attribute-Value Pairs) are as follows: <Pair-Id> is used to map the PAA 1000 with the corresponding PAR 900. AVP [RequestedData] is used to indicate what kind of prediction data the SBC 300 needs, for example, media types and the number of each media type during a period. AVP [RealData] is used by the SBC 300 to send the real data in the past period, for example, media types and the number of each media type. Then the PCF 100 may train its prediction parameters to be more precise based on this data. AVP [PredictionData] is used by the PCF 100 to send Prediction data.

A new resource reservation solution in the SBC 300 is used to reduce time. The solution includes two parts: a resource reservation in advance for all sessions, and a resource allocation per session.

Figure 11:
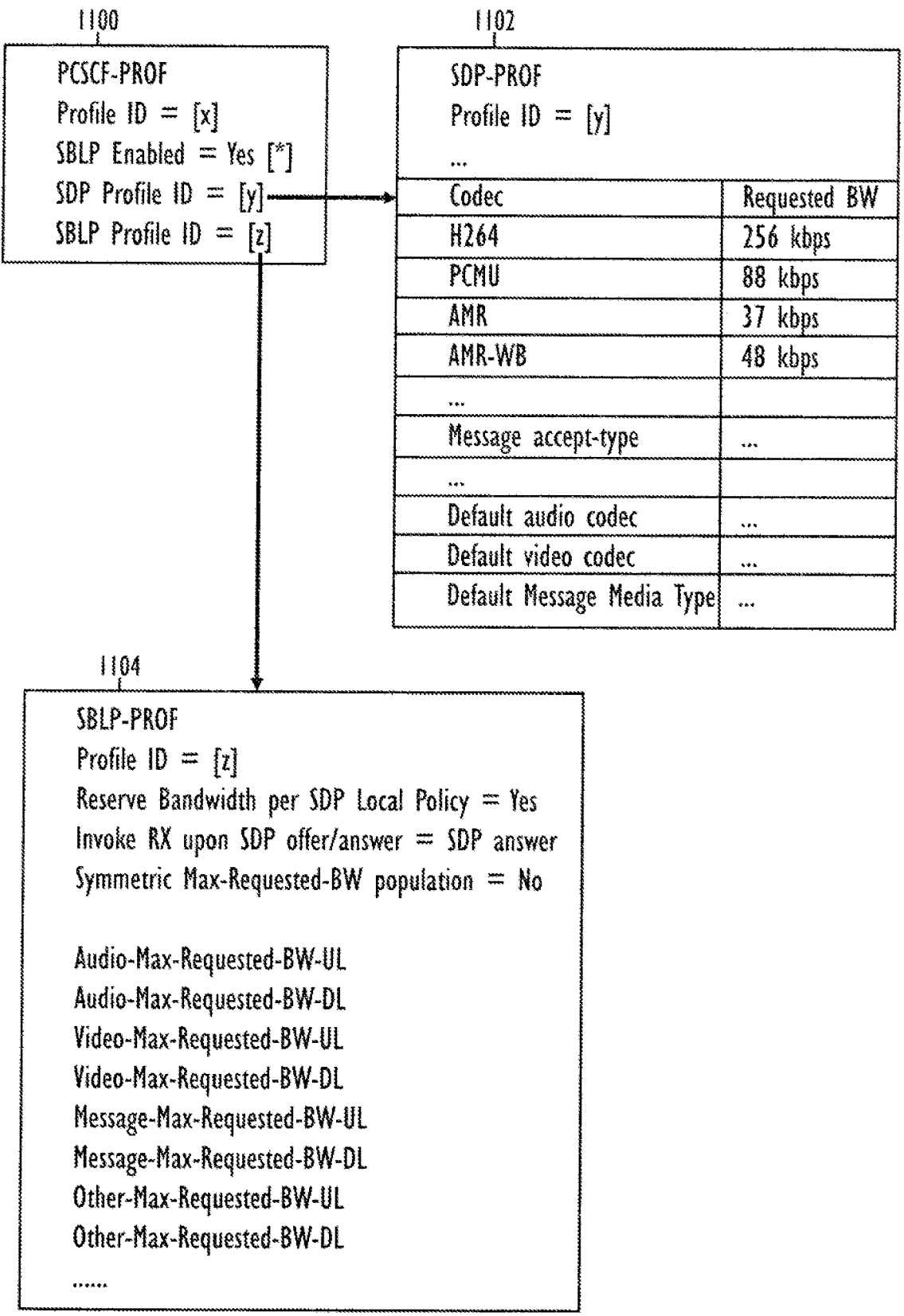
FIG. 11 illustrates an example embodiment of a PCSCF configuration data.

FIG. 11 illustrates an example embodiment of SBC 300 configuration data for calculating the total bandwidth, which is shown with a PCSCF profile 1100, an SDP profile 1102, and an SBLP (Service Based Local Policy) profile 1104. The SBC 300 uses the configuration data to calculate the total needed bandwidth when receiving the prediction data from the PCF 100.

First, when the SBC 300 gets the prediction results from the PCF 100, the SBC 300 checks how many audio and video media streams are predicted, and calculates the total bandwidth needed. The calculation may be as follows: the AF/ALG 1300 sets the maximum requested bandwidth—in uplink and downlink directions—according to the configuration data (i.e., SBLP or SDP local policy shown in FIG. 11). For example, there are 5 audio sessions and 4 video sessions, according to the configuration data, the maximum bandwidth of audio is 150, and video is 200, then the total bandwidth is 150*5+200*4=1550.

Second, the SBC 300 sends a message to the BGW 308 to request the resource reservation. In an example embodiment, an AA-Request message is reused for the resource reservation. The AA-Request includes the media stream number and the total needed bandwidth in a new optional AVP. An example embodiment of the AA-Request 1500 is illustrated in FIG. 15.

Third, after the reservation, the BGW 308 sends the result to the SBC 300 in an AA-Answer with a new optional AVP. The result 1200 is shown in FIG. 12. There are a number of IP, port bindings, and each binding is for one media stream. An example embodiment of the AA-Answer 1600 is shown in FIG. 16.

Let us study FIG. 13B illustrating a case wherein the UE1 110 starts one session, taking one pair of an SDP offer and answer as an example (same as in the explanation above).

In 1370, the AF/ALG 1300 receives and SDP offer from the UE1 110 with (UEip1, UEport1). The SDP includes media numbers and types and codec, etc.

In 1372, the AF/ALG 1300 selects one IP and a port binding from the binding list, and allocates the needed bandwidth from the pool of the session resources (=the whole bandwidth). For example, the AF/ALG 1300 selects (IP X, port X1) and (IP Z, port Z1).

In 1374, the AF/ALG 1300 adds the IP Z and port Z1 information to the SDP offer and sends to the UE2 120, then the UE2 120 knows to connect to this IP and port to transfer media.

In 1376, the AF/ALG 1300 receives an SDP answer from the UE2 120 with (UEip2, UEport2).

In 1378 and 1380, the AF/ALG 1300 sends an AA-Request to the PDF 1302, and the PDF 1302 sends an PP-Request, which includes UE1 information (UEip1, UEport1), UE2 information (UEip2, UEport2), the selected IP binding (IP X, port X1) and (IP Z, port Z1), and the chosen codecs 1350, 1360 in AVP BindingInputList to the BGW 308. Upon receiving related messages, the BGW 308 binds (UEip1, UEport1) with (IP X, port X1) and (UEip2, UEport2) with (IP Z, port Z1). A PP-Answer in 1382 and an AA-answer in 1384 give feedback from the BGW 306 via the PDF 1302 to the AF/ALG 1300.

In 1386, the AF/ALG 1300 adds the IP X, port X1 to an SDP answer and sends to the UE1 110, then the UE1 110 knows to connect to this IP and port to transfer media.

Next, let us study FIG. 14 illustrating a case wherein there are several pairs of an SDP offer and answer, taking two pairs of an SDP offer and answer as an example embodiment.

In 1420, the AF/ALG 1300 receives an SDP offer from the UE1 110 with (UEip1, UEport1). The SDP includes one media stream and codec, etc.

In 1422, the AF/ALG 1300 selects one IP, and a port binding from the BGW binding list, and allocates the needed bandwidth from the pool of the session resources. For example, the AF/ALG 1300 selects (IP X, port X1) and (IP Z, port Z1).

In 1424, the AF/ALG 1300 adds the IP Z, port Z1 information to an SDP offer and sends to the UE2 120, then the UE2 120 knows to connect to this IP and port to transfer this media stream data.

In 1426, the AF/ALG 1300 receive an SDP answer from the UE2 120 with (UEip2, UEport3).

In 1428, the AF/ALG 1300 adds the IP X, port X1 to an SDP answer and sends to the UE1 110, then the UE1 110 knows to connect to this IP and port to transfer this media stream.

In 1430, the UE1 110 sends the SDP offer again with another added media stream (UEip1, UEport2) to the previous media stream.

In 1422, after receiving the SDP offer, the AF/ALG 1300 selects another IP, port binding from the BGW binding list for this added media stream. For example, the AF/ALG 1300 selects (IP X, port X2) and (IP Z, port Z2).

In 1432, the AF/ALG 1300 adds the IP Z, port Z2 information to an SDP offer and sends to the UE2 120, then the UE2 120 knows to connect to this IP and port to transfer the added media.

In 1434, the AF/ALG 1300 receives an SDP answer from the UE2 120 with (UEip2, UEport4).

In 1436 and 1438, the AF/ALG 1300 sends an AA-Request to the PDF 1302, and the PDF 1302 sends an PP-Request, which includes UE information, the selected IP binding and the chosen codec 1450, 1460, 1470, 1480 for each media in AVP BindingInputList. Upon receiving related messages, the BGW 308 binds (UEip1, UEport1) with (IP X, port X1) and (UEip2, UEport2) with (IP Z, port Z1) for media 1, and bind (UEip1, UEport2) with (IP X, port X2) and (UEip2, UEport4) with (IP Z, port Z2) for media 2. A PP-Answer in 1440 and an AA-answer in 1442 give feedback from the BGW 306 via the PDF 1302 to the AF/ALG 1300.

In 1444, the AF/ALG 1300 adds the IP X, port X2 to an SDP answer and sends to the UE1 110, then the UE1 110 knows to connect to this IP and port to transfer this added media stream.

Without this example embodiment, if there are N pairs of an SDP offer and answer, the times of AA-Request/Answer and PP-Request/Answer interaction is be 2N. With the described example embodiment of FIG. 14, no matter how many Ns are, the time is always 1. This largely reduces the needed time.

Even though the invention has been described with reference to one or more example embodiments according to the accompanying drawings, it is clear that the invention is not restricted thereto but can be modified in several ways within the scope of the appended claims. All words and expressions should be interpreted broadly, and they are intended to illustrate, not to restrict, the example embodiments. It will be obvious to a person skilled in the art that, as technology advances, the inventive concept can be implemented in various ways.

The invention claimed is:

1. An apparatus, comprising:
one or more processors; and
one or more memories including computer program code,
the one or more memories and the computer program code are configured to, with the one or more processors, cause the apparatus at least to:
obtain a future traffic estimate in a data network of a cellular radio network based on past traffic in the data network;
request a pool of session resources from a border gateway of the data network based on the future traffic estimate; and
allocate repeatedly dedicated resources including an IP address and a port of the border gateway for each session from the pool of session resources as follows: whenever a Session Description Protocol offer arrives, allocate resources from the pool of session resources on its own without any message interactions with the border gateway, and notify the resource allocation to the border gateway only in connection with a final Session Description Protocol answer, whereby regardless of a number of Session Description Protocol offer-answer rounds, there is only one round of message interaction with the border gateway.

2. The apparatus of claim 1, wherein the one or more memories and the computer program code are further configured to, with the one or more processors, cause the apparatus at least to:
obtain the future traffic estimate based on a plurality of continuous predefined periods of the past traffic.

3. The apparatus of claim 1, wherein the one or more memories and the computer program code are further configured to, with the one or more processors, cause the apparatus at least to:
calculate a total bandwidth amount estimate based on the future traffic estimate; and
request the pool of session resources also based on the total bandwidth amount estimate.

4. The apparatus of claim 1, wherein the one or more memories and the computer program code are further configured to, with the one or more processors, cause the apparatus at least to:
obtain media types and an amount estimate of each media type in the future traffic estimate based on media types and an amount of each media type in the past traffic.

5. The apparatus of claim 4, wherein the one or more memories and the computer program code are further configured to, with the one or more processors, cause the apparatus at least to:
obtain a required quality of service estimate or a required latency estimate of each media type in the future traffic estimate based on a quality service or a latency in each media type of the past traffic.

6. The apparatus of claim 1, wherein the one or more memories and the computer program code are further configured to, with the one or more processors, cause the apparatus at least to:
request the pool of session resources from the border gateway using one or more custom messages of an Rx interface.

7. The apparatus of claim 1, wherein the apparatus is a session border controller.

8. The apparatus of claim 1, wherein the past traffic in the data network comprises statistics of the past traffic in the data network based on protocol data unit session policy information.

9. The apparatus of claim 1, wherein the future traffic estimate is obtained from a policy control function.

10. A method, comprising:
obtaining a future traffic estimate in a data network of a cellular radio network based on past traffic in the data network;

requesting a pool of session resources from a border gateway of the data network based on the future traffic estimate; and allocating repeatedly dedicated resources including an IP address and a port of the border gateway for each session from the pool of session resources as follows: whenever a Session Description Protocol offer arrives, allocating resources from the pool of session resources on its own without any message interactions with the border gateway, and notifying the resource allocation to the border gateway only in connection with a final Session Description Protocol answer, whereby regardless of a number of Session Description Protocol offer-answer rounds, there is only one round of message interaction with the border gateway.

11. The method of claim 10, further comprising:

obtaining the future traffic estimate based on a plurality of continuous predefined periods of the past traffic.

12. The method of claim 10, further comprising:

calculating a total bandwidth amount estimate based on the future traffic estimate; and requesting the pool of session resources also based on the total bandwidth amount estimate.

13. The method of claim 10, further comprising:

obtaining media types and an amount estimate of each media type in the future traffic estimate based on media types and an amount of each media type in the past traffic.

14. The method of claim 13, further comprising:

obtaining a required quality of service estimate or a required latency estimate of each media type in the future traffic estimate based on a quality service or a latency in each media type of the past traffic.

15. The method of claim 10, further comprising:

requesting the pool of session resources from the border gateway using one or more custom messages of an Rx interface.

16. The method of claim 10, wherein the past traffic in the data network comprises statistics of the past traffic in the data network based on protocol data unit session policy information.

17. A non-transitory computer-readable medium encoded with computer program code, which, when loaded into one or more processors and executed by the one or more processors, causes an apparatus to perform a method comprising:

obtaining a future traffic estimate in a data network of a cellular radio network based on past traffic in the data network;

requesting a pool of session resources from a border gateway of the data network based on the future traffic estimate; and allocating repeatedly dedicated resources including an IP address and a port of the border gateway for each session from the pool of session resources as follows: whenever a Session Description Protocol offer arrives, allocating resources from the pool of session resources on its own without any message interactions with the border gateway, and notifying the resource allocation to the border gateway only in connection with a final Session Description Protocol answer, whereby regardless of a number of Session Description Protocol offer-answer rounds, there is only one round of message interaction with the border gateway.

* * * * *